(No Model.)
J. GARBESI.
FLY NET.
No. 549,192. Patented Nov. 5, 1895.
Fig. 1.
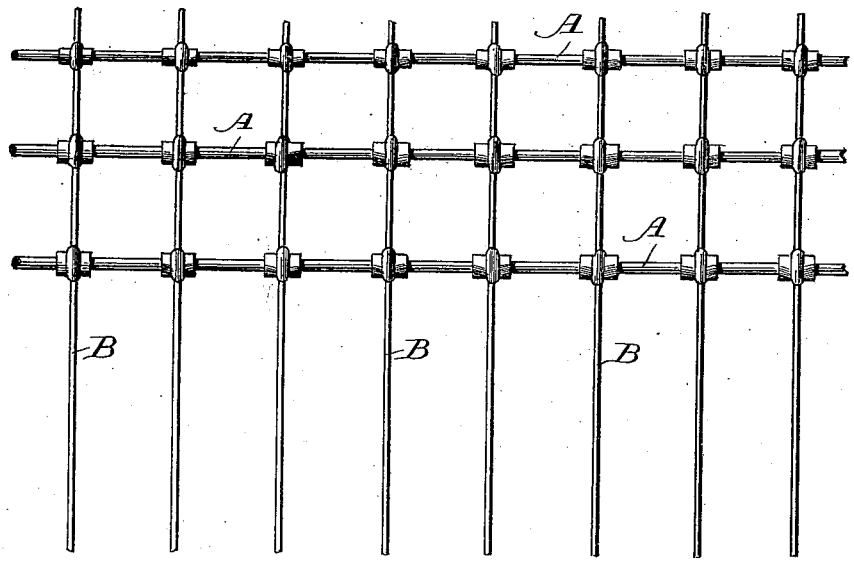
Fig. 2. Fig. 3.
 
Fig. 4.
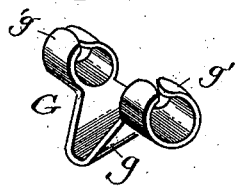
Witnesses
J. W. Reynolds
Chas. S. Hyer
Inventor
Joseph Garbesi
By John Wedderburn
Attorney

UNITED STATES PATENT OFFICE.

JOSEPH GARBESI, OF MOUNDSVILLE, WEST VIRGINIA, ASSIGNOR OF ONE-HALF TO W. H. WEBSTER, OF SAME PLACE.

FLY-NET.

SPECIFICATION forming part of Letters Patent No. 549,192, dated November 5, 1895.

Application filed March 7, 1894. Serial No. 502,713. (No model.)

*To all whom it may concern:*

Be it known that I, JOSEPH GARBESI, a citizen of the United States, and a resident of Moundsville, in the county of Marshall and State of West Virginia, have invented certain new and useful Improvements in Fly-Nets; and I do hereby declare the following to be a full, clear, and exact description of the invention, such as will enable others skilled in the art to which it appertains to make and use the same.

This invention relates to fly-nets, and has for its object, among others, to provide a strong and durable net which can be manufactured at a minimum cost and with the employment of less material than necessary in the constructions heretofore proposed.

A further object is to provide an improved rubber fly-net which is so constructed as to prevent the rubber from peeling off from the twine or other base upon which it is applied, and, further, to give the bars and lashes of the net a beautiful gloss, which serves, further, as a protection for the rubber.

Still another object is to so connect the bars and lashes of the net as to prevent cutting thereof. This is accomplished by a fastening, preferably of metal, of novel shape and mode of application, which is such that the ribs and lashes are secured together at direct right angles to one another and the danger of any sharp edge of the metal coming in contact with the rubber is avoided.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a perspective view of the fly-net. Fig. 2 is an enlarged cross-section of one of the bars or ribs and lashes of the net, showing its structure. Fig. 3 is a perspective view, on an enlarged scale, of a portion of a lash before the rubber is applied, showing the mastic or resinous coating on the twine. Fig. 4 is an enlarged perspective view of one of the fasteners.

Like letters of reference are employed to designate corresponding parts in the several views.

The fly-net complete is in its shape and form not unlike the prior forms. In the drawings, A A are its longitudinal ribs, and B B the transversely-arranged lashes.

The ribs and lashes are constructed as follows: I take a foundation of twine or analogous material C, either in the proper lengths desired for the construction of the fly-net or in greater lengths, which may be afterward cut to suit, and apply thereto a coating of some suitable mastic or resinous substance D, which may be applied thereto in any suitable manner, and which should be of such a nature as to cause the gum or rubber to adhere tightly thereto and to the twine without danger of peeling or stripping off. By the employment of this resinous coating I reduce materially the amount of rubber necessary to give to the ribs and lashes the proper amount of strength and durability. The rubber or gum is then applied in any suitable manner to this resinous-coated twine and allowed to dry, when the ribs and lashes are ready for use. The rubber or gum coating E may be of greater or less thickness, as may be deemed most expedient. In order to give to the ribs and lashes thus prepared a beautiful luster, I apply thereto, by extreme heat, a gloss-varnish F, as seen in Fig. 2, which is essential to the finished appearance of the ribs and lashes and also protects the rubber from the corrosive influence of the perspiration of the animal or from atmospheric action of any kind; and it furthermore prevents any discoloring of the rubber and makes the same at all times smooth and glossy, whereby one is enabled at all times to keep the net perfectly clean by simply washing it in cold water.

For securing the ribs and lashes at their points of intersection I employ a fastening such as is shown in Fig. 4, and which comprises a piece of metal G, arched transversely, as seen at g, and its ends provided with the transverse flanges or lugs g', which are designed to be bent around the ribs, as seen in Fig. 1, after which they are compressed thereabout while the arched portion receives the lash, about which it is crimped or held by punching, or both, as seen in Fig. 1. The lashes are elevated above the plane of the ribs, as shown, and there is no possibility of any sharp edges of the metal of the fastener coming in contact with the rubber of the ribs or lashes to injure the same.

Modifications in details of construction may be resorted to without departing from the spirit of the invention or sacrificing any of its advantages.

Having thus described the invention, what is claimed as new is—

An improved fly net comprising the longitudinal strands A, the transverse strand B and the metallic fastening G, at the juncture of the strands said fastenings being arched at G and the flanges at G', said end flanges being adapted to be bent around the longitudinal strands, substantially as shown and described.

In testimony whereof I have signed this specification in the presence of two subscribing witnesses.

JOSEPH GARBESI.

Witnesses:
 WILLIAM CRISWELL,
 J. B. WILSON.